(12) United States Patent
Atkinson et al.

(10) Patent No.: US 7,419,190 B1
(45) Date of Patent: Sep. 2, 2008

(54) UNIVERSAL WATER METER CONNECTOR ASSEMBLY

(76) Inventors: Manuel Diaz Atkinson, 102 Villa del Sur, Los Fresnos, TX (US) 78566; Mark Abraham, 781 Main St., Chathm, MA (US) 26330; John Darren Hall, 1111 Sussex Dr., Forney, TX (US) 75126; John A. Willding, 2830 Teakwood Dr., Garland, TX (US) 75044

( * ) Notice: Subject to any disclaimer, the term of this patent is extended or adjusted under 35 U.S.C. 154(b) by 365 days.

(21) Appl. No.: 11/385,424

(22) Filed: Mar. 21, 2006

Related U.S. Application Data (60) Provisional application No. 60/664,348, filed on Mar. 23, 2005.

(51) Int. Cl.
*F16L 33/00* (2006.01)
(52) U.S. Cl. ............. 285/249; 285/332.1; 285/323
(58) Field of Classification Search ........... 285/249, 285/248, 247, 332.1, 334.1, 323, 322, 114, 285/115, 116, 123.3, 123.1
See application file for complete search history.

(56) References Cited

U.S. PATENT DOCUMENTS

| | | | | | |
|---|---|---|---|---|---|
| 2,519,939 | A | * | 8/1950 | Smith | 285/123.1 |
| 3,814,466 | A | * | 6/1974 | Leopold, Jr. | 285/341 |
| 3,980,325 | A | * | 9/1976 | Robertson | 285/328 |
| 4,712,812 | A | * | 12/1987 | Weir, III | 285/148.23 |
| 4,871,196 | A | * | 10/1989 | Kingsford | 285/123.1 |
| 4,949,797 | A | * | 8/1990 | Isom | 285/123.1 |
| 6,746,055 | B1 | * | 6/2004 | Wood et al. | 285/249 |

* cited by examiner

*Primary Examiner*—David E Bochna
(74) *Attorney, Agent, or Firm*—Herbert L. Bello (57) ABSTRACT

A universal water meter connector assembly that is configured to be used with different sized water meter couplers and a variety of dwelling supply lines. The universal water meter connector assembly includes a hexagonal hollow body that terminates in an externally threaded head at one end. The hexagonal body is provided with an internally threaded medial portion an end adjacent the head and an internally threaded end portion at the other end of the hexagonal body. The thread size of the medial portion is smaller than the thread size of the end portion to accommodate different sized water meter couplers. A internal stop is formed in the body below the head and above the medial portion for limiting movement of a supply line inserted into the body. The free end of the head is formed with an internally tapered portion that is configured to receive a cone-shaped member having a narrow end and a wide end with a beveled rim. The narrow end of the cone-shaped member is sized and shaped to mate with the internally tapered portion of the head. A gripper ring with depending fingers is positioned on the beveled rim. An open ended connector nut with an internal flange at an upper end has an internally threaded portion that is sized to be threaded onto the externally threaded head. The gripper ring and cone-shaped members are positioned within the connector nut, the narrow end of the cone-shaped member positioned in the internally tapered portion of the head. The internal flange of the connector nut engages the gripper ring and urges the depending fingers into contact with a supply line inserted in the connector assembly when the connector nut is turned onto the externally threaded head.

19 Claims, 6 Drawing Sheets

¾" tube Socket  50  48

FIGURE 4

1" tube Socket  56  54

UNIVERSAL WATER METER CONNECTOR ASSEMBLY

CROSS-REFERENCE TO RELATED APPLICATIONS

Benefit is claimed under Title 35, United States Code, § 119 (c) of Provisional Application No. 60/664,348, filed Mar. 23, 2005.

BACKGROUND OF THE INVENTION

1. Field of Invention

The present invention relates to plumbing apparatuses, and more particularly, to a universal water meter connector assembly that is configured to be connected with different sized water meter couplers.

2. Description of the Prior Art

A water meter is connected to a supply line for a dwelling by means of a water meter connector. The water meter is provided with a meter coupler. The water meter connector couples the water meter coupler to the dwelling supply line. Since water meter couplers come in various sizes, for example, one inch and three-fourths of an inch, a plumber must carry different sized water meter connectors. Also, it is to be noted that a dwelling supply line can be made of a variety of materials from flexible tubing composed of a polymer or copper, for example, and rigid pipes. Since different sized water meter couplers and various dwelling supply lines are used, a plumber must carry a large number of meter connectors to cover the multitude of different combinations of meter coupler size and dwelling line material. That is, the plumber must carry meter connectors that are sized to fit the particular water meter coupler at the site. Also, the plumber must carry water meter connectors that are configured to interconnect with the particular dwelling supply line. A need has arisen for a relatively simple and inexpensive water meter connector assembly that can be used with different sized water meter couplers and a variety of dwelling supply lines.

SUMMARY OF THE INVENTION

An object of the present invention is to overcome the aforementioned limitations and disadvantages of prior art relating to the connection of water meters.

It is another object of the present invention to provide a universal water meter connector assembly that can be used with different sized water meter couplers and a variety of dwelling supply lines.

The present invention features a universal water meter connector assembly that is configured to be used with different sized water meter couplers and a variety of dwelling supply lines. The universal water meter connector assembly embodying the invention includes a hexagonal body that terminates in an externally threaded head at one end. The hexagonal body is provided with an internally threaded medial portion and an internally threaded end portion at an end of the hexagonal body. The thread size of the internally threaded medial portion is smaller than the thread size of the internally threaded end portion. The free end of the head is formed with an internally tapered portion that is configured to receive a cone-shaped member having a narrow end and a wide end with a beveled rim. The narrow end of the cone member is sized and shaped to mate with the internally tapered portion of the head. A gripper ring with depending fingers is positioned on the beveled rim of the cone-shaped member. A connector nut is formed with an internally threaded portion that is sized to be threaded onto the externally threaded head. An internal flange at an upper end of the connector nut engages the gripper ring and urges it against the cone-shaped member and the cone-shaped member is urged into the tapered portion of the head when the connector nut is turned onto the externally threaded head.

Other general and specific objects, features and advantages of the invention will in part be obvious and will in part appear hereinafter.

BRIEF DESCRIPTION OF THE DRAWINGS

An understanding of the nature and objects of the present invention will become more readily apparent upon consideration of the following detailed description taken in connection with the accompanying drawings, wherein.

DETAILED DESCRIPTION OF THE INVENTION

Figure 1:
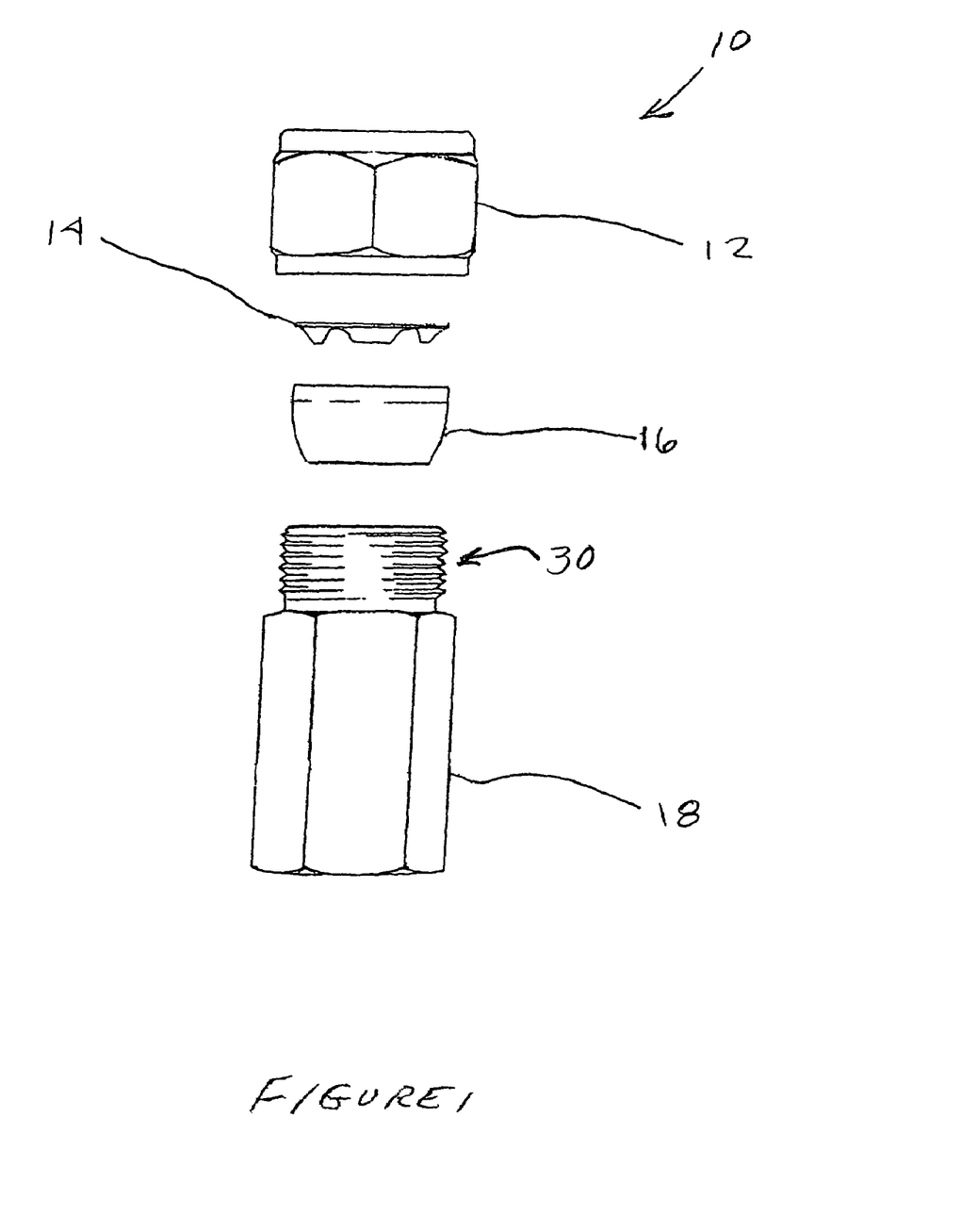
FIG. 1 is an exploded side view of a universal water meter connector assembly embodying the present invention.
Figure 2:
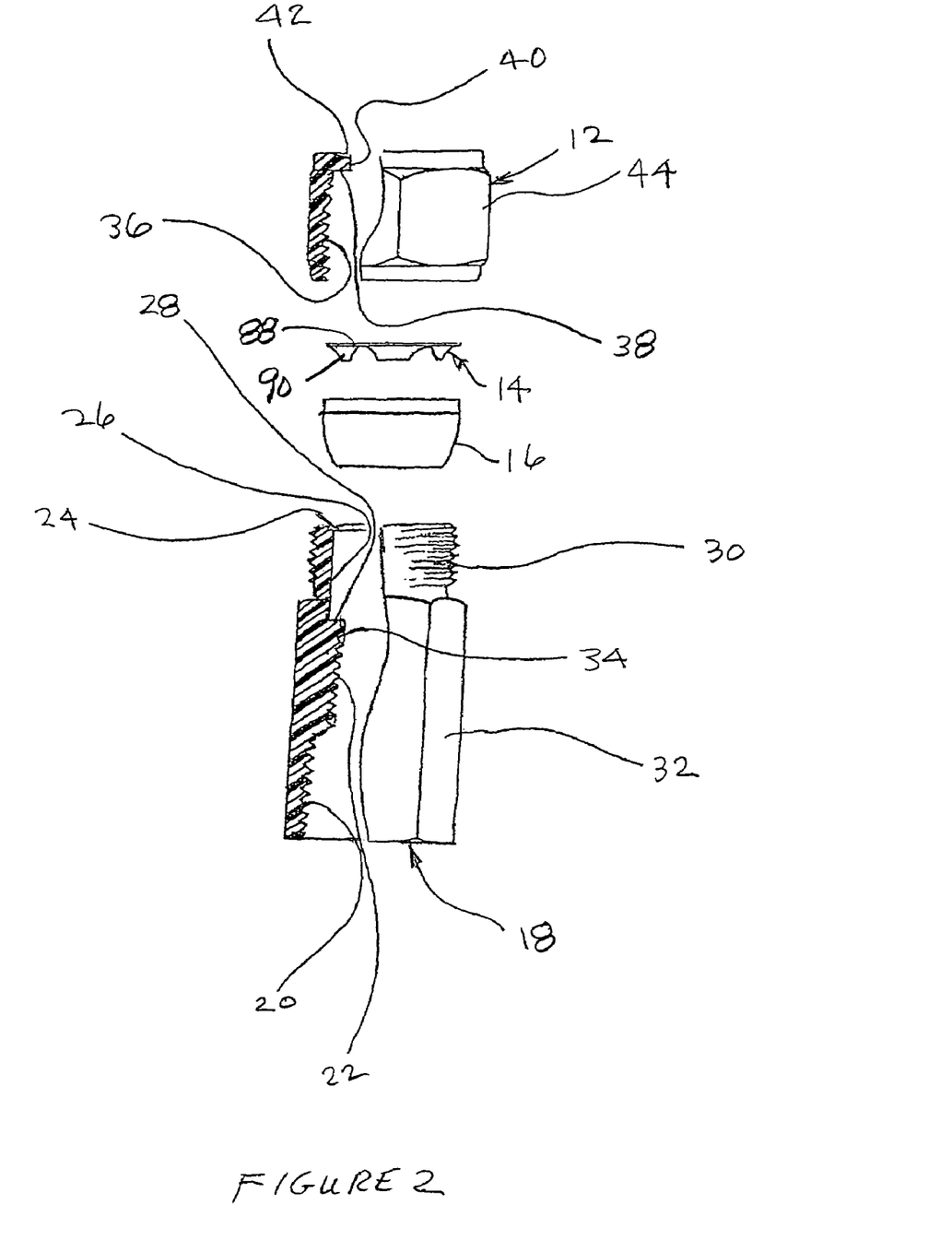
FIG. 2 is an exploded side view, partially in section, of the universal water meter connector assembly of FIG. 1.
Figure 8:
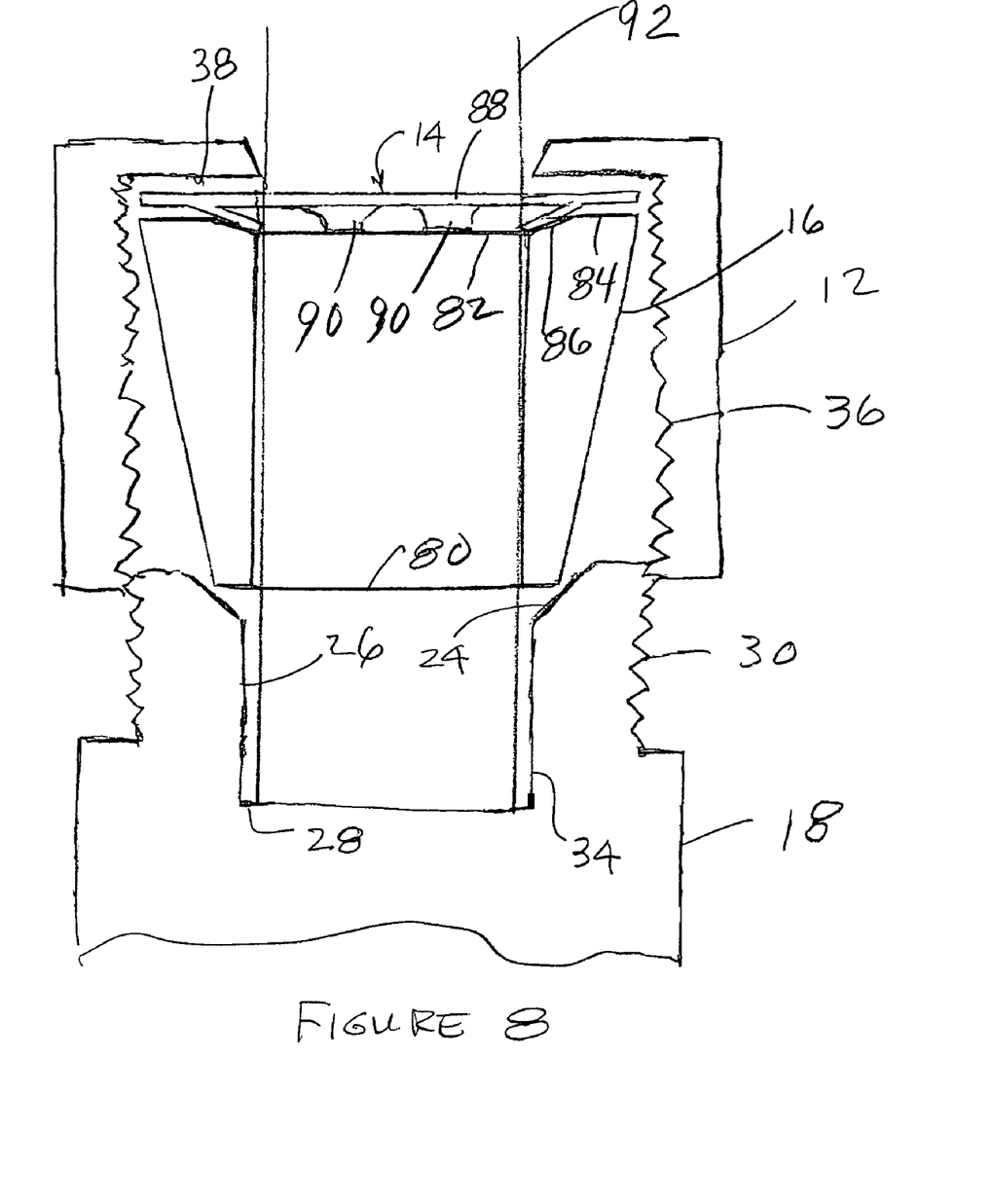
FIG. 8 is an illustrative exploded view showing the universal water meter connector assembly of FIG. 1. invention.

The following description, taken together with the drawings referred to therein, describes various aspects of a universal water meter connector assembly 10 embodying the invention. Referring now to the drawings, particularly FIGS. 1, 2 and 8, there is shown a universal water meter connector assembly 10 embodying the invention. Universal water meter connector assembly 10 includes a connector nut 12, a gripper ring 14, a cone 16 and a body 18. Body 18 includes an internally threaded end portion 20 and an internally threaded medial portion 22, the diameter threaded portion 20 being greater than the diameter of threaded portion 22. Internally threaded end portion 20 is at a bottom end of body 18 as viewed in FIG. 2 and internally threaded medial portion 22 is at a medial portion of the body 18. The exterior face of body 18 at threaded portions 20 and 22 has hexagonal sides 32. The top end of body 18 is provided with an internal beveled seat 24 that is sized and shaped to be in mating engagement with cone 16. The top end of body 18 is provided with a tube socket 26 that terminates in a stop 28, a bore 34 at the upper end of threaded portion 22. The upper end of body 18 is provided with an externally threaded head 30 that is sized to mate with internal threads 36 of connector nut 12.

An upper end of connector nut 12, as viewed in FIG. 2, is formed with a flange 38 that defines the diameter of an opening or bore 40 of connector nut 12. The upper end of flange 38 is beveled to provide an entry chute 42. In the illustrated embodiment, connector nut 12 has hexagonal sides 44.

Figure 3:
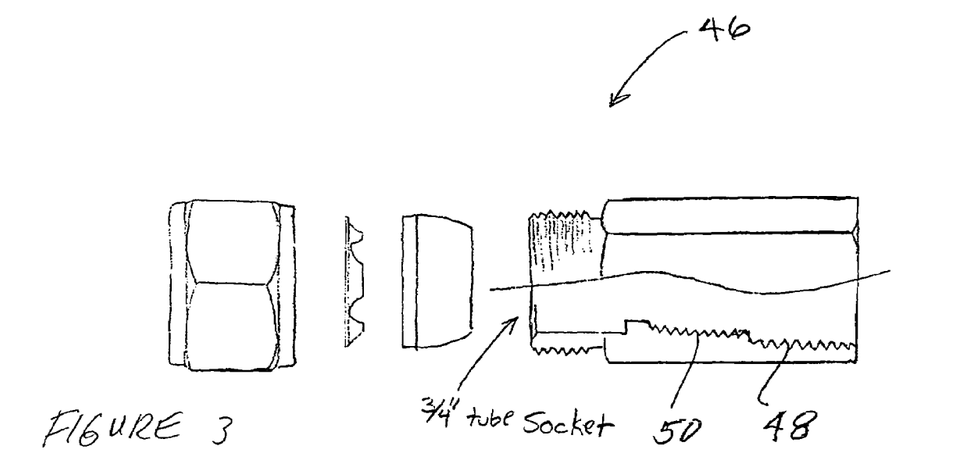
FIG. 3 is a side elevation view, partially in section, showing a ¾ inch nut-ring-cone (N.R.C.) universal water meter connector assembly with a ¾ inch×½ inch female iron pipe thread.
Figure 4:
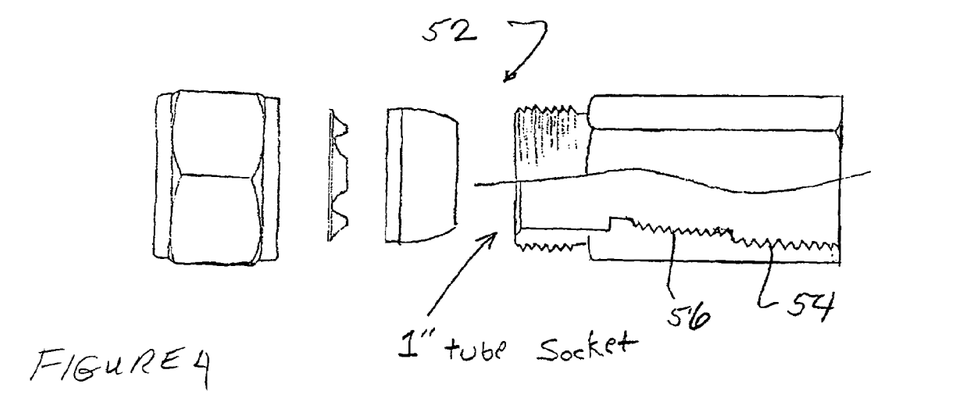
FIG. 4 is a side elevation view, partially in section, showing a 1 inch N.R.C. universal water meter connector assembly with a 1 inch×¾ inch female iron pipe thread.

Referring to FIG. 3 there is shown a ¾ inch nut-ring-cone (N.R.C.) universal water meter connector assembly 46 with a ¾ inch female iron pipe thread end portion 48 and a ½ inch female iron pipe thread medial portion 50. In FIG. 4 there is illustrated a 1 inch nut-ring-cone (N.R.C.) universal water meter connector assembly 52 with a 1 inch female iron pipe thread end portion 54 and a ¾ inch female iron pipe thread medial 56.

Figure 5:
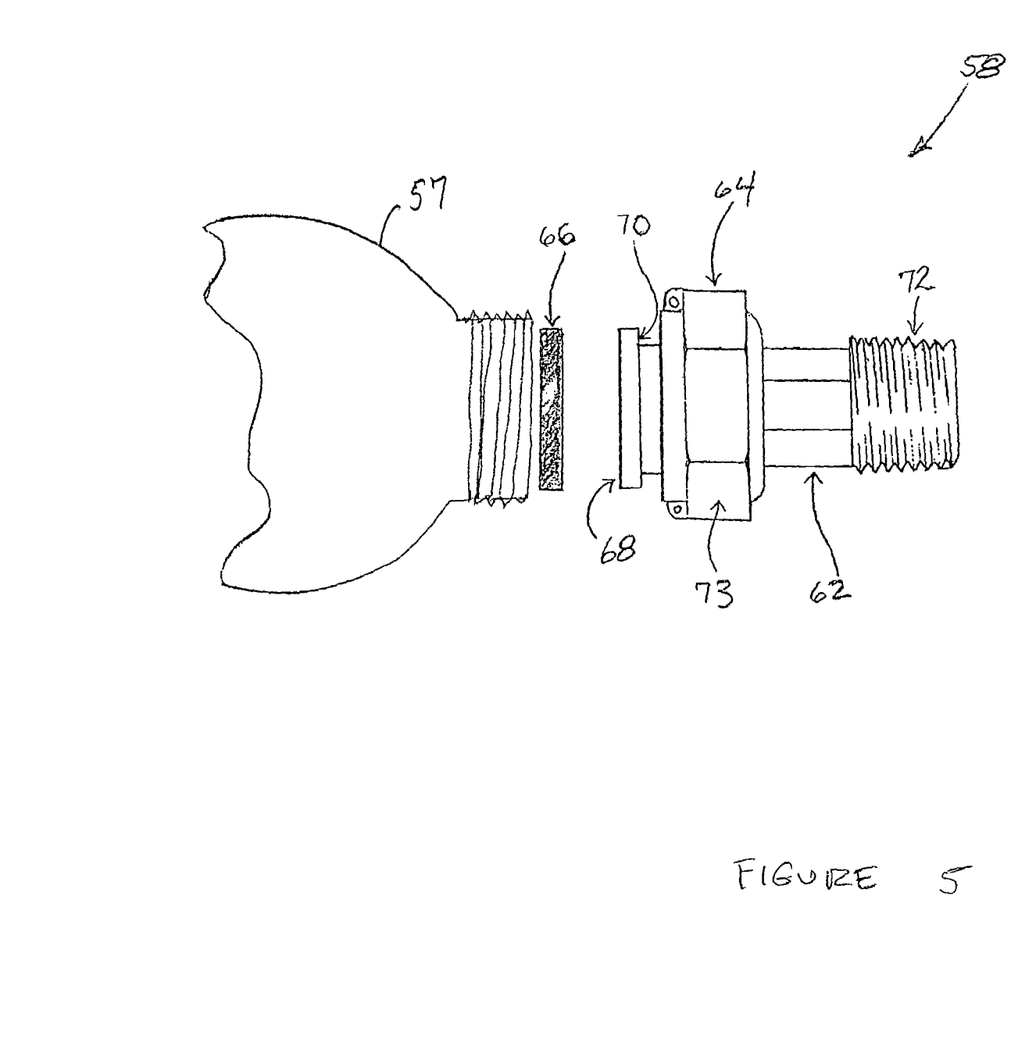
FIG. 5 is a side elevation view of a typical water meter coupler and water meter.

Referring to FIG. 5, there is shown a water meter 57 and a meter coupler 58 of the type that is typically supplied by a municipality. Meter coupler 58 includes a meter coupler body 62 and a coupler nut 64 that is positioned on the body 62. A seal 66, for example, a rubber washer seal, is configured to fit on a meter coupler washer seat 68 at one end of body 62 having a flange 70. A male iron pipe thread 72 is at an opposite end of body 62. In the illustrated embodiment, coupler nut 64 has hexagonal sides 73.

Figure 6:
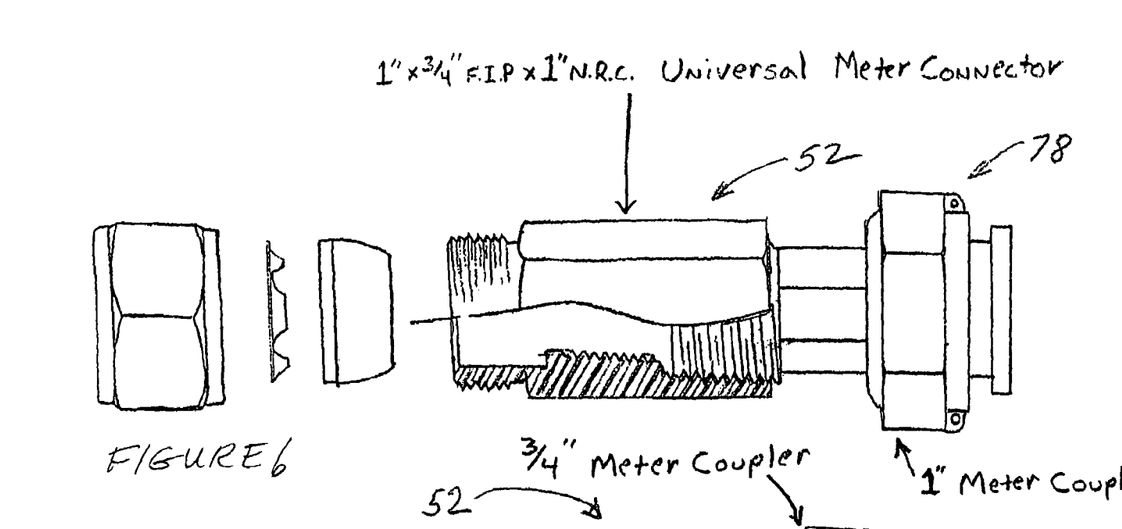
FIG. 6 is an exploded side view, partially in section, showing the universal water meter connector assembly of FIG. 4 connected to a 1 inch water meter coupler.
Figure 7:
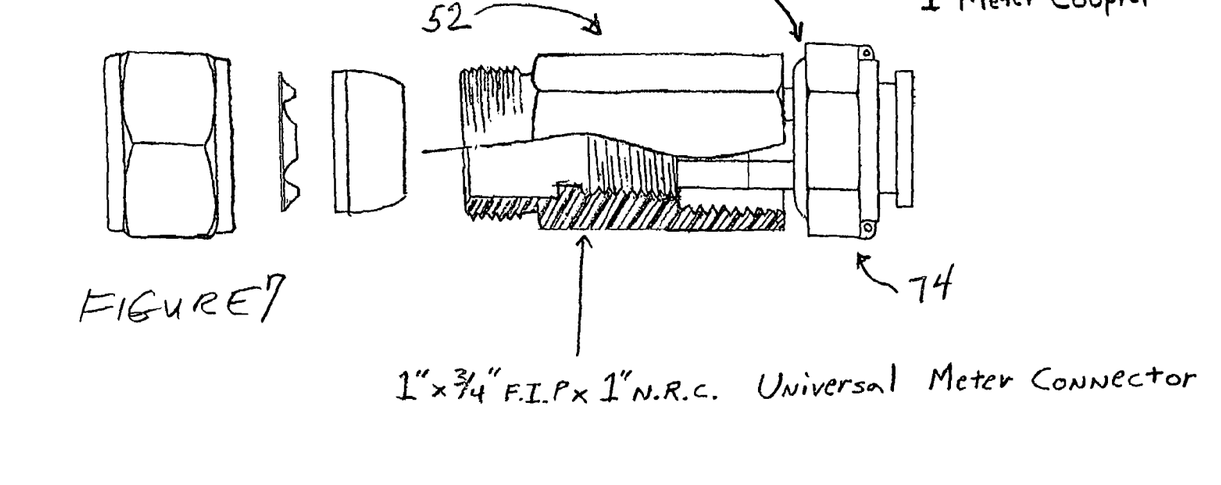
FIG. 7 is an exploded side view, partially in section, showing the universal water meter connector assembly of FIG. 4 connected to a ¾ inch water meter coupler.

FIG. 6 shows universal water meter connector assembly 52 connected to a 1 inch meter coupler 78. In FIG. 7, universal water meter connector assembly 52 is connected to ¾ inch water meter coupler 74.

As best shown in FIG. 8, cone-shaped member 16 has a narrow end 80 and a wide end 82. Wide end 82 has a rim 84 with an inwardly tapered bevel 86. In the illustrated embodiment, cone-shaped member 16 is composed of a thermoplastic, for example, a polybutylene teraphalate polyester.

Gripper ring 14 has a rim ring portion 88 with depending fingers 90 that depend inwardly and downwardly from the rim ring portion. Depending fingers 90 are positioned on the inwardly tapered bevel 86 of rim 84 of cone-shaped member 16. In the illustrated embodiment, gripper ring 14 is composed of stainless steel.

In operation of the invention, cone-shaped member 16 is positioned on beveled seat 24 and gripper ring 14 is placed on the inwardly tapered bevel 86 of rim 84 of cone-shaped member 16, depending feet 90 resting on bevel 86 and ring portion 88 above rim 84. Connector nut is placed over gripper ring 14 and cone-shaped member 16 and slightly threaded on threaded head 30.

A water service line 92 is inserted into connector nut 12, through gripper ring 14 and cone-shaped member 16 and into body 18 until it engaged stop 28. Next, connector nut 12 is tightened onto threaded head 30. As connector nut 12 is being tightened, flange 38 presses against gripper ring 14 and depending fingers 90 are urged downwardly and inwardly on bevel 86 into contact with service line 92, thereby securing the service line in water meter connector assembly 10. As connector nut 12 is tightened further, ring portion 88 of gripper ring 14 presses against cone-shaped member 16 and urges the cone-shaped member into beveled seat 24. Cone-shaped member 16 is pressed against service line 92 to form a water tight seal. Water meter connector assembly 10 is configured to accept service lines composed of different types of materials, for example, hard and soft copper tubing, chloropolyvinyl chloride tubing, polybutylene tubing, cross-linked polyethelyne tubing and polyethylene tubing.

Next, threaded end 72 of water meter coupler 58 is attached to water meter connector assembly 10. Depending upon the size of threaded end 72, water meter coupler 18 is threaded onto either threaded medial section 22 or threaded end section 20. Finally, water meter 57 is attached to water meter coupler 58 by tightening coupler nut 64 onto a threaded end 94 of water meter 57. It is to be understood that water meter 57 and water coupler 58 are attached to water meter connector assembly 10 first and then the procedure for securing service line 92 described above is performed.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A universal water meter connector assembly comprising:
   (a) a hexagonal body having a head with external threads at one end, said hexagonal body having an internally threaded medial portion and an internally threaded end portion at an end of said hexagonal body that is opposite said one end, said internally threaded medial portion having threads of a first size and said internally threaded end portion having threads of a second size, said first sized threads smaller than said second sized threads;
   (b) an open ended, hollow cone-shaped member having a wide opening at one end and a narrow opening at an opposite end, a rim at said wide end;
   (c) an internally tapered seat formed at an open end of said head, said internally tapered seat is configured to receive said cone-shaped member, said narrow end of said cone-shaped member is sized and shaped to mate with said internally tapered seat;
   (d) a gripper ring with a ring portion and fingers that depend inwardly and downwardly from said ring portion, said depending fingers positioned at an inner edge of said rim at said wide end of said cone-shaped member; and
   (e) a connector nut with an inwardly extending flange at an upper end, said connector nut formed with an internally threaded portion extending upwardly from a lower end of said connector nut toward said upper end, said internally threaded portion is sized to be threaded onto said external threads of said head, said cone-shaped member and said gripper ring positioned on said body and in said connector nut, said internal flange of said connector nut engaging said gripper ring and urging said ring portion against said cone-shaped member and urging said fingers inwardly of said rim when said connector nut is threaded onto said external threads of said head.

2. The universal water meter connector assembly as claimed in claim 1 wherein said rim has a beveled inner edge, said depending fingers positioned on said beveled inner edge.

3. The universal water meter connector assembly as claimed in claim 1 wherein said cone-shaped member is composed of a thermoplastic.

4. The universal water meter connector assembly as claimed in claim 3 wherein said thermoplastic is composed of polybutylene teraphalate polyester.

5. A universal water meter connector assembly for connecting a water meter assembly to a supply line, the water meter assembly having a threaded male coupler with one of two sized threads, said universal water meter connector assembly comprising:
   (a) a hexagonal body having a head with external threads at one end, said hexagonal body having an internally threaded medial portion and an internally threaded end portion at an end of said hexagonal body that is opposite said one end, said internally threaded medial portion having threads of a first size and said internally threaded end portion having threads of a second size, said first sized threads smaller than said second sized threads;
   (b) an open ended, hollow cone-shaped member having a narrow end and a wide end, a rim with a downwardly beveled inner edge at said wide end, said cone-shaped member sized and shaped to snugly receive the supply line;

(c) an internally tapered seat formed at free end of said head, said internally tapered seat is configured to receive said cone-shaped member, said narrow end of said cone-shaped member is sized and shaped to mate with said internally tapered seat;

(d) a gripper ring with ring portion and fingers that depend inwardly and downwardly from said ring portion, said depending fingers positioned at an inner edge of said rim at said wide end of said hollow cone-shaped member; and (e) a connector nut with an inwardly extending flange at an upper end, said connector nut formed with an internally threaded portion extending upwardly from a lower end of said connector nut toward said upper end, said internally threaded portion is sized to be threaded onto said external threads of said head, said cone-shaped member and said gripper ring positioned on said body and in said connector nut, said internal flange of said connector nut engaging said gripper ring and urging said gripper ring against said cone-shaped member when a lower end of said connector nut is turned onto said external threads of said head;

(f) the supply line is inserted into said head through a said gripper ring and through a said cone-shaped member, said internal flange of said connector nut engaging said gripper ring and urging said gripper ring against a said cone-shaped member when a lower end of said connector nut is turned onto said external threads of said head, said depending fingers of a said cone-shaped member pressed against and urged into gripping engagement with the supply line, said narrow ends of said cone-shaped member compressed against said internally tapered seat and forming a water tight seal, said internally a threaded medial portion sized to be connected to a water meter connector assembly having threads that are sized and shaped to be threaded onto said internally threaded medial portion, said internally threaded end portion sized to be connected to a water meter connector assembly having threads that are sized and shaped to be threaded onto said internally threaded an end portion.

6. The universal water meter connector assembly as claimed in claim 5 wherein a stop is formed in said body adjacent an inner end of said internally threaded medial portion for engaging and limiting forward movement of the supply line inserted into said head.

7. The universal water meter connector assembly as claimed in claim 6 wherein said cone-shaped member is composed of a thermoplastic.

8. The universal water meter connector assembly as claimed in claim 5 wherein said cone-shaped member is composed of polybutylene teraphalate polyester.

9. A universal water meter connector assembly for connecting a water meter assembly having a threaded male coupler to a supply line, said universal water meter connector assembly comprising:

(a) a hexagonal body having a head with external threads at one end, said hexagonal body having an internally threaded medial portion and an internally threaded end portion at an end of said hexagonal body that is opposite said one ends, said internally threaded medial portion having threads of a first size and said internally threaded end section having threads of a second size, said first sized threads smaller than said second sized threads, said internally a threaded medial portion sized to be connected to a water meter connector assembly having threads that are sized and shaped to be threaded onto said internally threaded medial portion, said internally a threaded end portion sized to be connected to a water meter connector assembly having threads that are sized and shaped to be threaded onto said internally threaded end portion, an internal tapered seat formed in said one end of said hexagonal body;

(b) engaging means for receiving and holding the supply line, said engaging means sized to be seated in said internally tapered seat;

(c) a connector nut with an inwardly extending flange at an upper end, said connector nut formed with an internally threaded portion extending upwardly from a lower end of said connector nut toward said upper end, said internally threaded portion is sized to be threaded onto said external threads of said head, said engaging means positioned on said body and in said connector nut, said internal flange of said connector nut engaging said engaging means and urging said engaging means into gripping engagement with the supply line received in said engaging means.

10. The universal water meter connector assembly as claimed in claim 9 wherein said engaging means includes:

(a) an open ended, hollow cone-shaped member having a narrow end and a wide end, said narrow end sized and shaped to snugly receive the supply line, said internally tapered seat configured to receive said cone-shaped member, said narrow end of said cone-shaped member is sized and shaped to mate with said internally tapered seat; and (b) a gripper ring, said gripper ring configured to seat on said wide end of said cone-shaped member;

(c) a supply line is inserted into said head through said gripper ring and through said cone-shaped member, said internal flange of said connector nut engaging said gripper ring and urging said gripper ring against said cone-shaped member when a lower end of said connector nut is turned onto said external threads of said head, said cone-shaped member compressed against the supply line and forming a water tight seal.

11. The universal water meter connector assembly as claimed in claim 10 wherein said gripper ring is provided with depending fingers, said depending fingers positioned within said wide end of said hollow cone-shaped member when said gripper ring is seated on said wide end of said cone-shaped member.

12. The universal water meter connector assembly as claimed in claim 9 wherein a stop is formed in said body adjacent an inner end of said internally threaded medial portion for engaging and limiting forward movement of the supply line inserted into said head.

13. The universal water meter connector assembly as claimed in claim 9 wherein said cone-shaped member is composed of a thermoplastic.

14. The universal water meter connector assembly as claimed in claim 9 wherein said cone-shaped member is composed of polybutylene teraphalate polyester.

15. A universal water meter connector assembly for connecting a water meter assembly having a threaded male coupler to a supply line, said universal water meter connector assembly comprising:

(a) an internally threaded connector nut formed with a beveled entranceway;

(b) a gripper ring with depending fingers, said depending fingers positioned within said wide end of said hollow cone-shaped member when said gripper ring is seated on said wide end of said cone-shaped member with;

(c) a hollow, open ended cone-shaped member having a narrow end and a wide end, said gripper ring configured to rest on said cone-shaped member; and (d) an open ended body, said body having an externally threaded portion at one end, an internally threaded medial portion and an internally threaded end portion at an end opposite said one end, said internally threaded connector nut sized to be threaded on said externally threaded portion of said body, said cone-shaped member and said gripper ring positioned on said body and in said internally threaded connector nut, said internally threaded medial portion having threads of a first size and said internally threaded end portion having threads of a second size, said first sized threads smaller than said second sized threads, said internally threaded medial portion sized to be connected to a water meter connector assembly having threads that are sized and shaped to be threaded onto said internally threaded medial portion, said internally threaded end portion sized to be connected to a water meter connector assembly having threads that are sized and shaped to be threaded onto said internally threaded end portion.

16. The universal water meter connector assembly as claimed in claim 15 wherein said cone-shaped member is composed of a thermoplastic.

17. The universal water meter connector assembly as claimed in claim 15 wherein said cone-shaped member is composed of polybutylene teraphalate polyester.

18. The universal water meter connector assembly as claimed in claim 15 including an internally tapered seat formed at said one end of said body, said internally tapered seat is configured to receive said cone-shaped member, said narrow end of said cone-shaped member is sized and shaped to mate with said internally tapered seat.

19. The universal water meter connector assembly as claimed in claim 15 wherein a stop is formed in said body adjacent an inner end of said internally threaded medial portion for engaging and limiting forward movement of the supply line inserted into said head.

* * * * *